（12) United States Patent
DaCosta et al.

(10) Patent No.: US 8,722,556 B2
(45) Date of Patent: *May 13, 2014

(54) RECOVERY OF SLURRY UNSUPPORTED CATALYST

(75) Inventors: Andre R. DaCosta, Bakersfield, CA (US); Paul Bryan, Pinole, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 1350 days.

This patent is subject to a terminal disclaimer.

(21) Appl. No.: 12/004,014

(22) Filed: Dec. 20, 2007

(65) Prior Publication Data

US 2009/0163348 A1  Jun. 25, 2009

(51) Int. Cl.
*B01J 38/48* (2006.01)
*B01D 61/14* (2006.01)
*C10G 31/09* (2006.01)
*C10G 31/11* (2006.01)
*B01J 27/051* (2006.01)

(52) U.S. Cl.
CPC ............... *B01J 38/48* (2013.01); *B01D 61/142* (2013.01); *B01D 61/147* (2013.01); *C10G 31/09* (2013.01); *C10G 31/11* (2013.01); *B01D 2315/10* (2013.01); *B01J 27/051* (2013.01); *B01J 27/0515* (2013.01); *B01D 2311/06* (2013.01); *B01D 2321/2058* (2013.01)
USPC ............. 502/22; 502/21; 502/24; 502/31; 502/56; 208/151; 208/302; 208/304; 208/143; 208/108; 208/161; 208/157; 208/162; 208/424; 208/177; 208/305

(58) Field of Classification Search
None
See application file for complete search history.

(56) References Cited

U.S. PATENT DOCUMENTS

| 2,487,867 | A | 11/1949 | Griffin, Jr. |
| 2,515,062 | A | 7/1950 | Smith |
| 2,774,742 | A | 12/1956 | Stover et al. |
| 2,787,599 | A | 4/1957 | Belden |
| 3,250,819 | A | 5/1966 | Cabbage |
| 3,429,805 | A | 2/1969 | Karbosky |
| 3,923,643 | A | 12/1975 | Lewis et al. |
| 4,040,958 | A | 8/1977 | Rammler |
| 4,049,765 | A | 9/1977 | Yamazaki |
| 4,105,731 | A | 8/1978 | Yamazaki |
| 4,120,698 | A | 10/1978 | Atchinson et al. |
| 4,169,506 | A | 10/1979 | Berry |
| 4,172,782 | A | 10/1979 | Masuko et al. |
| 4,211,816 | A | 7/1980 | Booker et al. |

(Continued)

FOREIGN PATENT DOCUMENTS

WO  WO 99/58732  11/1999

OTHER PUBLICATIONS

VSEP technology from New Logic Research, Feb. 2007.*
U.S. Appl. No. 12/004,015, inventors Shah, et al.

(Continued)

*Primary Examiner* — Melvin C Mayes
*Assistant Examiner* — Smita Patel

(57) ABSTRACT

A method of recovering unsupported fine catalyst from heavy oil comprises combining a slurry comprising unsupported fine catalyst in heavy oil with solvent to form a combined slurry-solvent stream. The combined slurry-solvent stream is filtered in a deoiling zone. A stream comprising unsupported fine catalyst and solvent is recovered from the deoiling zone. Unsupported fine catalyst is separated from the stream comprising unsupported fine catalyst and solvent. The deoiling zone can comprise a membrane that is rapidly displaced in a horizontal direction.

23 Claims, 11 Drawing Sheets

(56) References Cited

U.S. PATENT DOCUMENTS

| | | | | |
|---|---|---|---|---|
| 4,224,135 A | | 9/1980 | Gidaspow | |
| 4,248,686 A | | 2/1981 | Gidaspow | |
| 4,277,731 A | | 7/1981 | Pomgracz | |
| 4,305,463 A | | 12/1981 | Zakiewicz | |
| 4,353,418 A | | 10/1982 | Hoekstra et al. | |
| 4,382,068 A | | 5/1983 | Rokukawa | |
| 4,395,315 A | | 7/1983 | Zambrano | |
| 4,407,707 A | | 10/1983 | Merchant, Jr. et al. | |
| 4,415,541 A | | 11/1983 | Melin | |
| 4,416,754 A | | 11/1983 | Merchant, Jr. et al. | |
| 4,431,520 A | * | 2/1984 | Giuliani et al. | 208/112 |
| 4,436,636 A | | 3/1984 | Carnicom | |
| 4,482,766 A | | 11/1984 | Stonner | |
| 4,514,368 A | | 4/1985 | Hubred | |
| 4,544,479 A | | 10/1985 | Yan | |
| 4,579,637 A | | 4/1986 | Jaisinghani et al. | |
| 4,581,112 A | | 4/1986 | Mintz | |
| 4,584,140 A | | 4/1986 | Blewett et al. | |
| 4,622,118 A | | 11/1986 | Chimenti | |
| 4,636,317 A | | 1/1987 | Lewis | |
| 4,648,964 A | | 3/1987 | Leto et al. | |
| 4,655,927 A | | 4/1987 | Ford | |
| 4,657,745 A | | 4/1987 | Hyatt | |
| 4,661,265 A | * | 4/1987 | Olson et al. | 210/804 |
| 4,662,669 A | | 5/1987 | Erickson et al. | |
| 4,666,685 A | | 5/1987 | Wiewiorowski | |
| 4,668,379 A | | 5/1987 | Rosensweig et al. | |
| 4,732,664 A | | 3/1988 | Solari Martini et al. | |
| 4,756,821 A | * | 7/1988 | Giuliani et al. | 208/102 |
| 4,769,127 A | | 9/1988 | Erickson et al. | |
| 4,790,941 A | | 12/1988 | Taylor | |
| 4,844,804 A | | 7/1989 | Taylor | |
| 4,846,976 A | | 7/1989 | Ford | |
| 4,850,498 A | | 7/1989 | Taylor | |
| 4,888,104 A | | 12/1989 | Ramirez de Aqudelo | |
| 4,927,794 A | | 5/1990 | Marcantonio et al. | |
| 4,937,218 A | | 6/1990 | Ramirez de Aqudelo | |
| 4,940,529 A | | 7/1990 | Beaton et al. | |
| 4,946,068 A | | 8/1990 | Erickson et al. | |
| 4,954,240 A | | 9/1990 | Eidt, Jr. et al. | |
| 4,990,241 A | | 2/1991 | Buttke et al. | |
| 5,006,264 A | | 4/1991 | Acuna | |
| 5,008,001 A | * | 4/1991 | Kitamura et al. | 208/143 |
| 5,013,427 A | | 5/1991 | Mosby | |
| 5,013,533 A | | 5/1991 | Howard et al. | |
| 5,021,160 A | | 6/1991 | Wolpert | |
| 5,046,856 A | | 9/1991 | McIntire | |
| 5,053,118 A | | 10/1991 | Houser | |
| 5,059,331 A | | 10/1991 | Goyal | |
| 5,070,064 A | | 12/1991 | Hsu et al. | |
| 5,080,721 A | | 1/1992 | Flanigan et al. | |
| 5,124,025 A | | 6/1992 | Kolstad et al. | |
| 5,124,026 A | | 6/1992 | Taylor et al. | |
| 5,124,027 A | | 6/1992 | Beaton et al. | |
| 5,149,433 A | | 9/1992 | Lien | |
| 5,169,968 A | | 12/1992 | Rice | |
| 5,183,572 A | | 2/1993 | Benn | |
| 5,194,154 A | | 3/1993 | Moyer et al. | |
| 5,198,007 A | | 3/1993 | Moyer | |
| 5,209,840 A | | 5/1993 | Sherwood, Jr. et al. | |
| 5,228,978 A | | 7/1993 | Taylor et al. | |
| 5,230,791 A | | 7/1993 | Sherwood, Jr. | |
| 5,230,804 A | | 7/1993 | Leupold et al. | |
| 5,242,578 A | | 9/1993 | Taylor et al. | |
| 5,254,513 A | | 10/1993 | Sherwood, Jr. et al. | |
| 5,258,117 A | | 11/1993 | Kolstad et al. | |
| 5,269,934 A | | 12/1993 | Dubrovsky et al. | |
| 5,290,959 A | | 3/1994 | Rice | |
| 5,370,788 A | | 12/1994 | Dai et al. | |
| 5,372,722 A | | 12/1994 | Schwering et al. | |
| 5,445,728 A | | 8/1995 | Sherwood, Jr. et al. | |
| 5,474,668 A | | 12/1995 | Ackerson et al. | |
| 5,480,553 A | | 1/1996 | Yamamori et al. | |
| 5,484,755 A | | 1/1996 | Lopez | |
| 5,512,084 A | | 4/1996 | Mauterer | |
| 5,525,235 A | | 6/1996 | Chen et al. | |
| 5,527,473 A | | 6/1996 | Ackerman | |
| 5,599,463 A | | 2/1997 | Hedrick | |
| 5,620,588 A | | 4/1997 | Ackerson et al. | |
| 5,683,916 A | | 11/1997 | Gaffe et al. | |
| 5,698,101 A | | 12/1997 | Kopp et al. | |
| 5,750,026 A | | 5/1998 | Gadkaree et al. | |
| 5,770,078 A | | 6/1998 | Hedrick | |
| 5,845,993 A | | 12/1998 | Shirtum et al. | |
| 5,853,564 A | | 12/1998 | Ackerson et al. | |
| 5,885,422 A | | 3/1999 | Kurukchi et al. | |
| 5,900,159 A | | 5/1999 | Engel et al. | |
| 5,916,440 A | | 6/1999 | Garcera et al. | |
| 5,922,201 A | | 7/1999 | Yamamori et al. | |
| 5,944,998 A | | 8/1999 | Rolchigo et al. | |
| 6,017,022 A | | 1/2000 | Shirtum | |
| 6,024,862 A | | 2/2000 | Ackerson et al. | |
| 6,036,865 A | | 3/2000 | Miller et al. | |
| 6,045,703 A | | 4/2000 | Miller | |
| 6,068,760 A | | 5/2000 | Benham et al. | |
| 6,110,390 A | | 8/2000 | Potter et al. | |
| 6,129,839 A | | 10/2000 | Maing, Jr. | |
| 6,180,072 B1 | | 1/2001 | Veal et al. | |
| 6,224,765 B1 | | 5/2001 | Watanabe et al. | |
| 6,281,405 B1 | | 8/2001 | Davis et al. | |
| 6,375,843 B1 | | 4/2002 | Potter et al. | |
| 6,380,452 B1 | | 4/2002 | Davis et al. | |
| 6,390,304 B1 | | 5/2002 | Wilson et al. | |
| 6,454,932 B1 | | 9/2002 | Baldassari et al. | |
| 6,491,822 B2 | | 12/2002 | Alper | |
| 6,517,725 B2 | | 2/2003 | Spearman et al. | |
| 6,518,441 B2 | | 2/2003 | Grosch et al. | |
| 6,548,197 B1 | | 4/2003 | Chandran et al. | |
| 6,656,342 B2 | | 12/2003 | Smith et al. | |
| 6,683,783 B1 | | 1/2004 | Smalley et al. | |
| 6,726,832 B1 | | 4/2004 | Baldassari et al. | |
| 6,762,209 B1 | | 7/2004 | Neathery et al. | |
| 6,764,598 B2 | | 7/2004 | Yu et al. | |
| 6,790,934 B2 | | 9/2004 | Johnson et al. | |
| 6,841,062 B2 | | 1/2005 | Reynolds | |
| 6,887,390 B2 | | 5/2005 | Mohedas et al. | |
| 7,214,309 B2 | | 5/2007 | Chen et al. | |
| 7,285,225 B2 | * | 10/2007 | Copeland et al. | 210/785 |
| 2002/0014449 A1 | * | 2/2002 | Rios et al. | 210/321.67 |
| 2002/0190005 A1 | | 12/2002 | Branning | |
| 2004/0232075 A1 | * | 11/2004 | Wells | 210/636 |
| 2005/0067194 A1 | | 3/2005 | Pena et al. | |
| 2006/0054533 A1 | * | 3/2006 | Chen et al. | 208/108 |
| 2006/0054534 A1 | | 3/2006 | Chen et al. | |
| 2006/0054535 A1 | | 3/2006 | Chen et al. | |
| 2006/0058174 A1 | | 3/2006 | Chen et al. | |
| 2006/0058175 A1 | | 3/2006 | Chen et al. | |
| 2006/0135631 A1 | * | 6/2006 | Kopponen et al. | 518/716 |
| 2007/0025899 A1 | | 2/2007 | Marcantonio | |
| 2007/0138055 A1 | | 6/2007 | Farshid et al. | |
| 2007/0138057 A1 | | 6/2007 | Farshid et al. | |
| 2008/0135450 A1 | * | 6/2008 | Reynolds et al. | 208/108 |
| 2008/0156700 A1 | | 7/2008 | Abulnaga et al. | |
| 2009/0163347 A1 | * | 6/2009 | Shah et al. | 502/21 |

OTHER PUBLICATIONS

U.S. Appl. No. 12/004,028, inventor Chen.
U.S. Appl. No. 12/003,218, inventors Powers, et al.
U.S. Appl. No. 12/004,032, inventors Lopez et al.

* cited by examiner

RECOVERY OF SLURRY UNSUPPORTED CATALYST

BACKGROUND

As light oil reserves are gradually being depleted and the costs of development (e.g., lifting, mining, and extraction) of heavy oil resources have decreased, a need has arisen to develop novel upgrading technologies to convert heavy oils and bitumens into lighter products. The "bottom of the barrel", or high boiling range material (i.e., vacuum residue) from crude oil, is difficult to convert into lighter products via conventional processes. Thus, what is needed are new technologies that achieve 90-100% conversion of vacuum residue, which would offer significant promise in resolving the problems associated with the disposition of large amounts of vacuum residue.

SUMMARY

In an embodiment, a method of recovering unsupported fine catalyst from heavy oil comprises filtering a slurry comprising unsupported fine catalyst in heavy oil in a deoiling zone. A stream comprising unsupported fine catalyst is recovered from the deoiling zone. Unsupported fine catalyst is separated from the stream comprising unsupported fine catalyst.

In an embodiment, a method of recovering unsupported fine catalyst from heavy oil comprises combining a slurry comprising unsupported fine catalyst in heavy oil with solvent to form a combined slurry-solvent stream. The combined slurry-solvent stream is filtered in a deoiling zone. A stream comprising unsupported fine catalyst and solvent is recovered from the deoiling zone. Unsupported fine catalyst is separated from the stream comprising unsupported fine catalyst and solvent.

In an embodiment, a method of recovering unsupported fine catalyst from heavy oil comprises combining a slurry comprising unsupported fine catalyst in heavy oil with solvent to form a combined slurry-solvent stream. The combined slurry-solvent stream is filtered through a cross-flow microfiltration unit. A retentate stream of the cross-flow microfiltration unit is recovered. The retentate stream of the cross-flow microfiltration unit is combined with solvent to form a combined retentate-solvent stream. The combined retentate-solvent stream is filtered through a cross-flow microfiltration unit.

In an embodiment, a method for separating fine catalyst from heavy oil comprises filtering fine catalyst from heavy oil using a membrane by rapidly displacing the membrane in a horizontal direction. A retentate of the membrane comprises the fine catalyst and a permeate of the membrane comprises the heavy oil.

In an embodiment, a method of recovering unsupported fine catalyst from heavy oil comprises combining a slurry comprising unsupported fine catalyst in heavy oil with solvent to form a combined slurry-solvent stream. The combined slurry-solvent stream is filtered using a membrane by rapidly displacing the membrane in a horizontal direction. A retentate stream of the membrane, comprising the unsupported fine catalyst and solvent, and a permeate of the membrane, comprising the heavy oil and solvent, are recovered. Unsupported fine catalyst is recovered from the retentate stream of the membrane.

In an embodiment, a method of concentrating a slurry comprising unsupported fine catalyst in heavy oil comprises filtering heavy oil from fine catalyst using a membrane by rapidly displacing the membrane in a horizontal direction to produce a concentrated slurry and recovering the concentrated slurry.

BRIEF DESCRIPTION OF THE DRAWING FIGURES

DETAILED DESCRIPTION

Definitions and Terms

Figure 1:
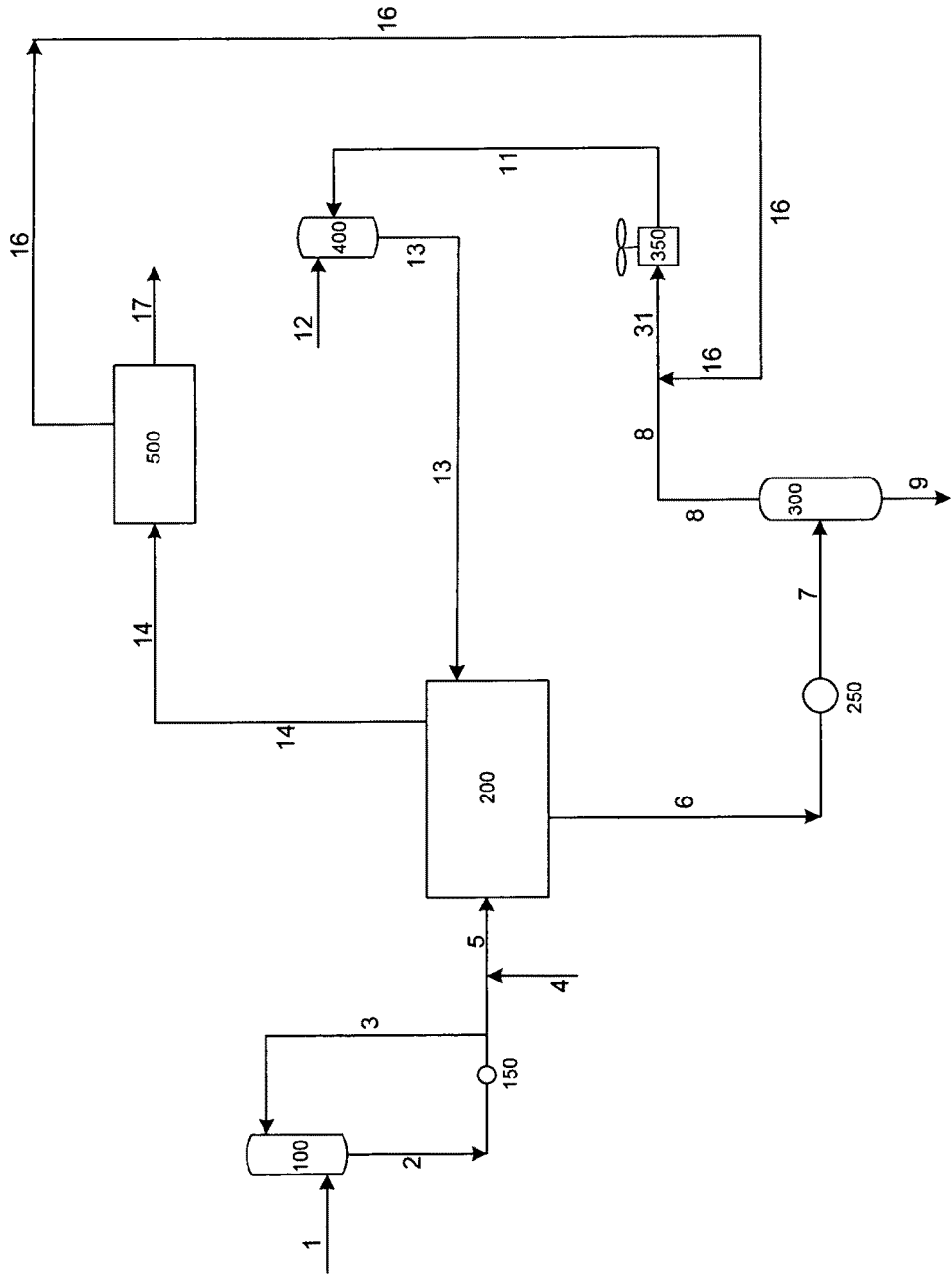
FIG. 1 is a block diagram of a first embodiment described herein.

The following terms will be used throughout the specification and will have the following meanings unless otherwise indicated.

"Average flux" refers to a time weighted average flux measured over a particular concentration range.

"Batch concentration" refers to a Vibratory Shear Enhanced Processing (V*SEP) machine configuration where a fixed amount of feed slurry is progressively concentrated by removal of permeate from the system. The concentrate from the system is returned to a feed tank.

"Concentrate", also known as "retentate", refers to the portion of solution that does not permeate through a membrane. Stated otherwise, it is the portion of solution that is rejected by the pores of a membrane and accordingly, which does not filter through the membrane.

"Concentration factor" refers to a ratio of feed flow rate to concentrate flow rate.

"Cross-flow" refers to a stream being filtered flows across the face of a membrane, with only a portion of the liquid in the solids-containing stream passing through the membrane. In contrast, in conventional filtration, the full stream, rather than just a portion of the stream, is forced through the membrane, with solids retained by the membrane.

"Diafiltration" refers to a cross-flow filtration process allowing for the transfer of low molecular weight species, water and/or solvents through a membrane without changing the solution volume. Diafiltration is used for purifying retained large molecular weight species, increasing the recovery of low molecular weight species, buffer exchange and simply changing the properties of a given solution.

"Feed", also known as "feed slurry", refers to a solution that is offered for filtration. The feed typically has suspended solids or molecules, which are to be segregated from a clear filtrate and reduced in size, making a concentrated solution of feed slurry.

"Fouling" refers to accumulation of materials on a membrane surface or structure, which results in a decrease in flux.

"Flux", which is not the same as flow rate, refers to a measurement of the volume of fluid that passes through a membrane during a certain time interval for a set area of membrane (i.e., gallons of permeate produced per $ft^2$ of membrane per day (gfd) or liters per $m^2$ per hour).

"Heavy oil" refers to an oil characterized by low hydrogen to carbon ratios and high carbon residues, asphaltenes, nitrogen, sulfur and metal contents. Examples include atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers.

"Instantaneous flux" refers to flux measured at a given moment in time.

"Line-Out Study" refers to a procedure of measuring membrane flux over time in order to determine eventual stability.

"Microfiltration" refers to filtration of particles suspended in solution, which are greater than or equal to 0.1 µm or 500,000 daltons in size or weight. In an embodiment, microfiltration refers to membrane filtration in which hydrostatic pressure forces a liquid against a semipermeable membrane. Suspended catalyst particles (which are greater than or equal to 0.1 µm or 500,000 daltons in size or weight, as noted above), are retained, while unconverted heavy oil and solvent pass through the membrane.

"Optimum pressure" refers to a maximum pressure, above which performance is detrimentally affected.

"Percent recovery" refers to a ratio of permeate flow rate to feed flow rate.

"Permeate", also known as "filtrate", refers to the portion of solution that filters through a membrane. The particle size of solids still suspended is determined by the pore size of the discriminating membrane.

Heavy Oil Upgrading

Heavy oil upgrading is utilized to convert heavy oils or bitumens into commercially valuable lighter products. Suitable feeds to a process for upgrading heavy oils using a slurry catalyst composition, include, for example, atmospheric residuum, vacuum residuum, tar from a solvent deasphlating unit, atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers. The feed is supplied to a reactor, wherein the feed is reacted with a catalyst slurry described in further detail below and preferably hydrogen.

In an embodiment, the catalyst slurry is concentrated prior to heavy oil upgrading, for example, to aid in the transport of catalyst (slurry) to the heavy oil upgrading. Such concentration can be done, for example, using Vibratory Shear Enhanced Processing (V*SEP), described in further detail below. In particular, V*SEP can be used to concentrate catalyst slurry to a solids contents of, for example, about 60-70 weight %. Due, in part, to the concentrated catalyst slurry having a reduced volume as compared to the volume of the catalyst slurry prior to concentration, the concentrated catalyst slurry can then be more easily transported to a heavy oil upgrading site or reactor, where it can be reconstituted to a solids contents of, for example, about 5 weight %, prior to heavy oil upgrading.

In an embodiment, the reactor for the heavy oil upgrading is a liquid recirculating reactor, although other types of upflow reactors may be employed. The catalyst slurry can be useful for, but not limited to, hydrogenation upgrading processes such as thermal hydrocracking, hydrotreating, hydrodesulphurization, hydrodenitrification, and hydrodemetalization. Effluent streams from the reactor, perhaps following downstream processing, such as, for example, separation(s), can include one or more valuable light products as well as a stream containing unsupported catalyst in unconverted feed.

Processing of an effluent steam containing unsupported catalyst in unconverted feed is described herein. In particular, the cost of the catalyst, and more specifically the expensive metal(s) that comprise the catalyst, may necessitate the recovery of catalyst from unconverted feed to ensure an economical heavy oil upgrading process. Additionally, the recovery of catalyst from unconverted feed may allow for 90-100% conversion of heavy oil. However, the high molecular weight of the unconverted heavy oil feed makes it difficult to separate unsupported catalyst therefrom. Further, conventional filtration processes may not be suitable to separate catalyst from unconverted feed, as the unsupported fine catalyst may cause plugging or fouling of filters.

Deoiling

In an embodiment, a method of recovering unsupported fine catalyst from heavy oil comprises filtering a slurry comprising unsupported fine catalyst in heavy oil in a deoiling zone. A stream comprising unsupported fine catalyst is recovered from the deoiling zone. Unsupported fine catalyst is separated from the stream comprising unsupported fine catalyst. The stream recovered from the deoiling zone can comprise unsupported fine catalyst in solvent, and in an embodiment, the unsupported fine catalyst is separated by evaporation to dryness.

In an embodiment, a method of recovering unsupported fine catalyst from heavy oil comprises combining a slurry comprising unsupported fine catalyst in heavy oil with solvent to form a combined slurry-solvent stream. The combined slurry-solvent stream is filtered in a deoiling zone. A stream comprising unsupported fine catalyst and solvent is recovered from the deoiling zone. Unsupported fine catalyst is separated from the stream comprising unsupported fine catalyst and solvent (e.g., by evaporation to dryness). The slurry and solvent can be combined prior to the deoiling zone or in the deoiling zone. The deoiling zone can include diafiltration, described in further detail, below. In an embodiment, a second stream is produced in the deoiling zone comprising the heavy oil and solvent. Solvent can be recovered from the second stream comprising the heavy oil and solvent for reuse, with the recovered heavy oil being a product.

Spent slurry catalyst in unconverted slurry bleed oil (USBO) is transferred into a light specific gravity solvent, such as, for example, toluene, naphtha, reformate (light aromatics), kerosene, or diesel boiling range material, in a filtration apparatus. The solvent is added in a ratio of about 1:1-10:1, based on spent catalyst slurry volume. The mixed stream is solvent washed in a deoiling zone and transferred from a heavy, USBO into a low boiling range solvent. The products from the deoiling zone include a stream with the catalyst and a higher percentage of solvent and a stream without catalyst and with a relatively high percentage of USBO. From the deoiling zone a stream consisting of solvent and carrier oil mixture is routed to a splitter column, which produces an overhead stream of solvent, which is recirculated to solvent tankage for use in the washing process, and a bottoms stream of carrier oil, which is sent to product recovery, a hydroprocessing section, or to another residue disposition unit. The bottoms stream, containing valuable product, and consisting of highly concentrated spend catalyst in solvent, proceed to a drying step for final devolatilization. The drying step can involve, for example, evaporation at ambient conditions, slight warming in a dryer, or processing through a more robust thin-film combination type drying. Deoiling and drying allows for production of a sufficiently hydrocarbon-dry material to meet downstream metals recovery requirements.

Referring to FIG. 1, feedstock 1 to deoiling zone 200 enters slurry drum 100 where feedstock 1 is stored and continuously mixed by slurry pump 150. Feedstock 1 leaves slurry drum 100 via line 2 and passes to slurry pump 150, which pumps feedstock 1 up to the operating pressure of deoiling zone 200. A portion of the feedstock in line 2 is recycled to slurry drum 100 through line 3 to agitate the feedstock and prevent agglomeration of the catalyst particles in slurry drum 100. A main portion of the feedstock in line 2 continues to deoiling zone 200, but just before entering deoiling zone 200, feedstock 1 is mixed with light hydrocarbon solvent 4, for example, a toluene rich stream, to dilute the unconverted resid hydrocarbon oil and form stream 5, which is fed to deoiling zone 200.

In the description that follows, light hydrocarbon solvent 4 is toluene. In deoiling zone 200, unconverted oil is completely removed from the catalyst particles of stream 5, leaving stream 6 consisting of unconverted oil in toluene. Stream 6 is sent to heat exchanger 250 to form heated stream 7, which enters separator 300 where flashed off overhead is toluene vapor stream 8 and unconverted oil is removed as liquid stream 9. In an embodiment, separator 300 is a distillation column, in order to achieve a sharp separation between solvent and recovered oil. Liquid stream 9 can be recycled to the vacuum resid unit for further processing or sent to product storage. Stream 14 from the deoiling zone 200 consists of catalyst particles, carbon fines, and metal fines less stream 6 consisting of unconverted oil in toluene. Stream 14 proceeds to drying zone 500 where toluene vapor stream 16 is separated from catalyst, carbon fines, and metal fines (i.e., hydrocarbon-free solids) in stream 17. Stream 17 can then pass to a catalyst regeneration system to reactivate the catalyst. The drying zone can be evaporation and solids devolatilization equipment known to those skilled in the art.

Toluene vapor streams 8 and 16 are combined into composite toluene vapor stream 31, which enters condensing unit 350 where the toluene is converted from a vapor state to a liquid state and leaves the condensing unit as liquid toluene stream 11. Liquid toluene stream 11 enters solvent storage drum 400, from which toluene is recycled to the deoiling zone 200 via line 13. Make-up toluene stream 12 is added to solvent storage drum 400, since a small amount of toluene is lost through vaporization.

Figure 2:
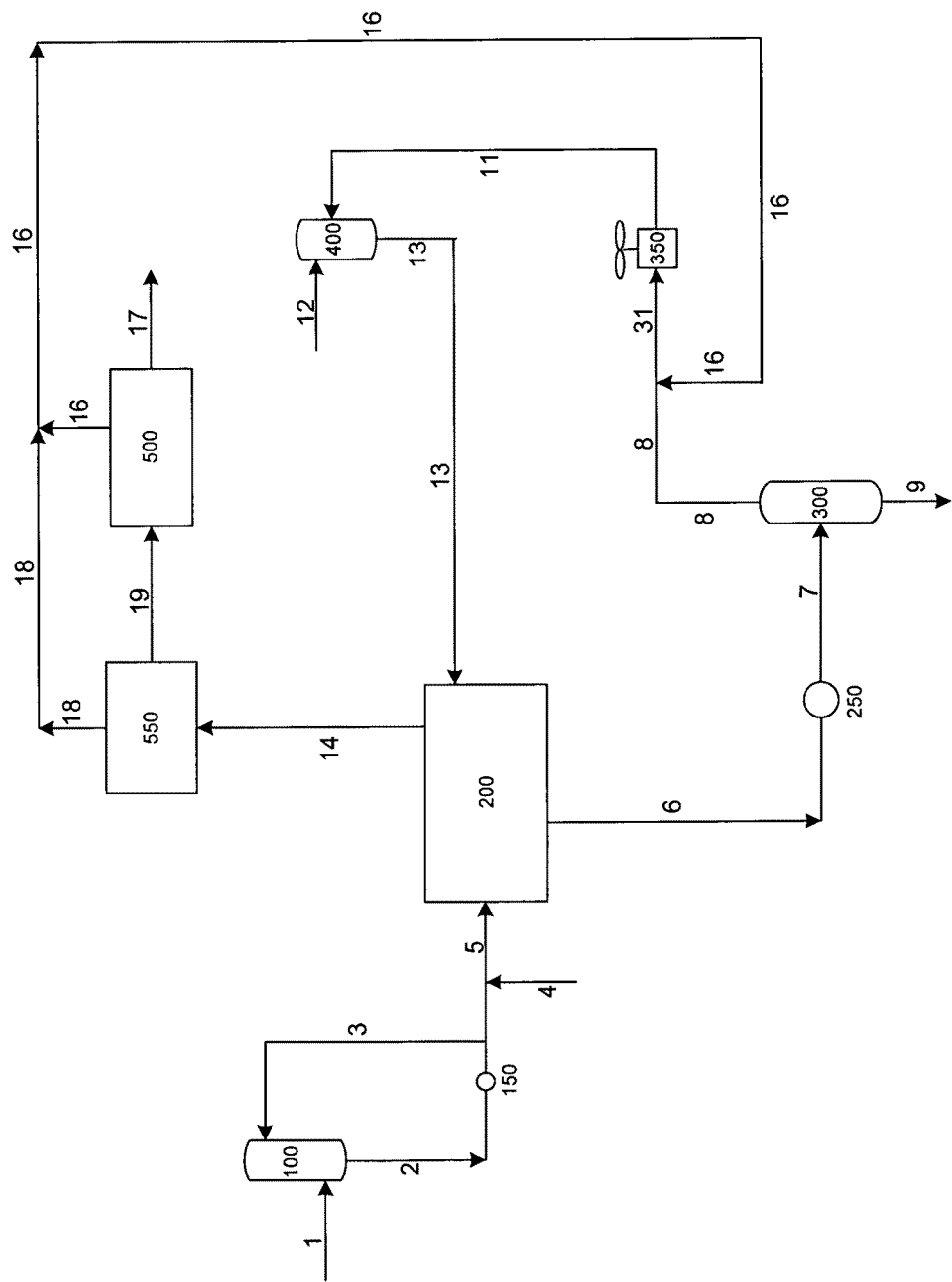
FIG. 2 is a block diagram including a variation on the process of FIG. 1.

Referring to FIG. 2, in addition to the equipment shown in FIG. 1, stream 14 from the deoiling zone 200, consisting of catalyst particles, carbon fines, and metal fines less stream 6, can be sent to slurry concentration zone 550, from which a portion of stream 14 (stream 19) is fed to drying zone 500 and a portion of stream 14 is fed via line 18 to be mixed into toluene vapor stream 16 from drying zone 500.

Figure 3:
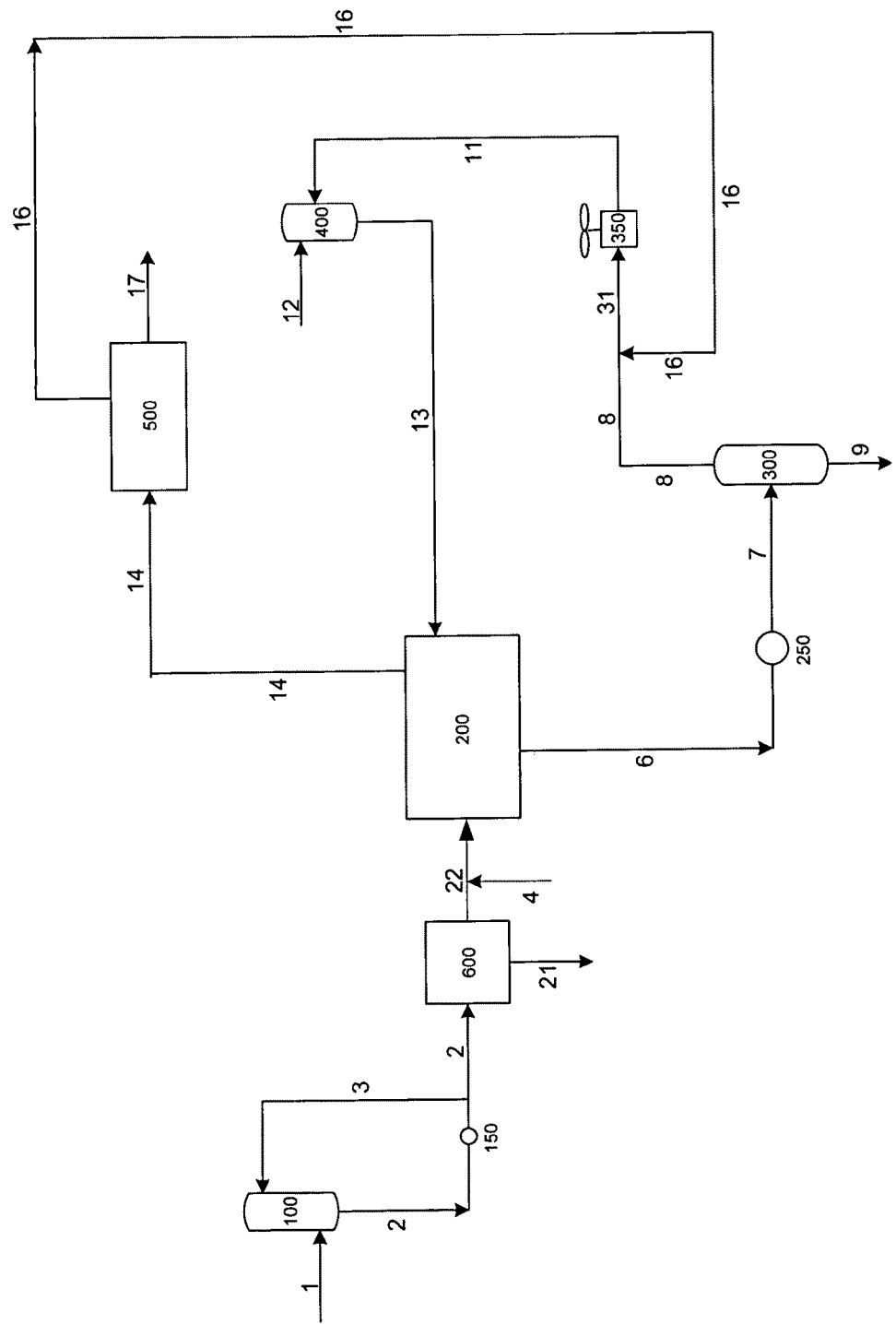
FIG. 3 is a block diagram including a variation on the process of FIG. 1, different from the variation of FIG. 2.

Referring to FIG. 3, in addition to the equipment shown in FIG. 1, prior to feedstock 1 being mixed with light hydrocarbon solvent 4, line 2 can be fed to slurry concentration zone 600, from which unconverted oil 21 is removed. Stream 22 (i.e., feedstock 1 less unconverted oil 21) is then be mixed with light hydrocarbon solvent 4 and fed to deoiling zone 200.

Figure 4:
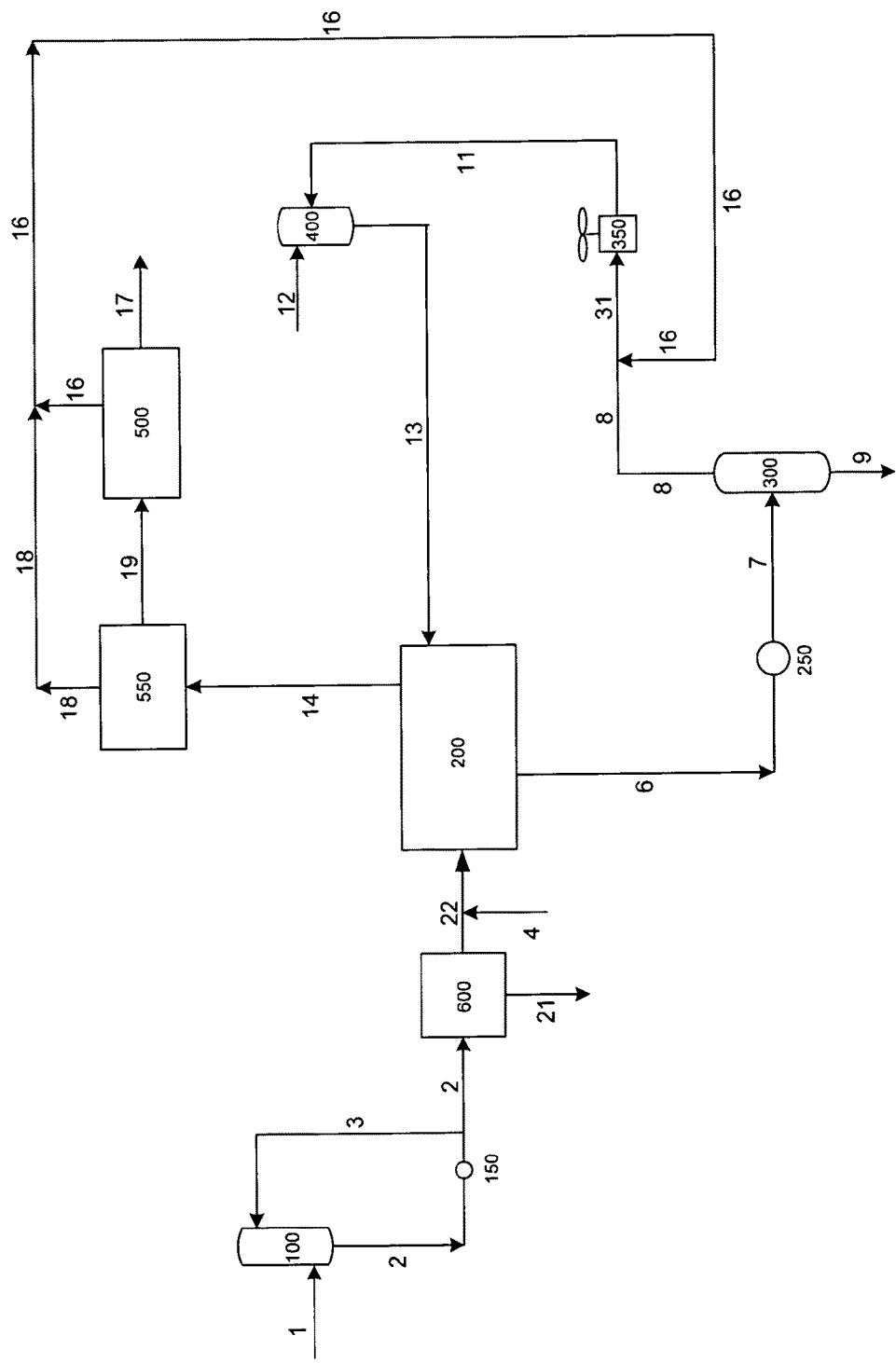
FIG. 4 is a block diagram incorporating the variations illustrated in both FIGS. 2 and 3.

Referring to FIG. 4, both slurry concentration zone 550, described above with reference to FIG. 2, and slurry concentration zone 600, described above with reference to FIG. 3, can be utilized in addition to the equipment shown in FIG. 1.
Catalyst Slurry The presently described method utilizes catalysts in the conversion (in particular, hydroconversion) of heavy oil (i.e., reaction of a slurry comprising unsupported fine catalyst in heavy oil) into one or more light oil products. In an embodiment, the catalysts are composed predominantly of compounds such as a Group VI and/or Group VIII metal compound sulfide, for example, molybdenum sulfide ($MoS_2$) and nickel sulfide (NiS), as described in U.S. Pat. No. 5,484,755 and U.S. Patent Application Publication Nos. 2006/0054534 A1, 2006/0054535 A1, 2006/0058174 A1, and 2006/0058175 A1, the contents of which are hereby incorporated by reference in their entireties. The highly active, unsupported catalysts typically exhibit particle size distributions in the range of about 1-8 μm, with some smaller and larger particles existing on either end of the range. In particular, the catalyst particles can have a size distribution in the range of about 0.2-20 μm, and a mean particle size of about 4-5 μm, with the mode being about 6-7 μm.

Figure 5:
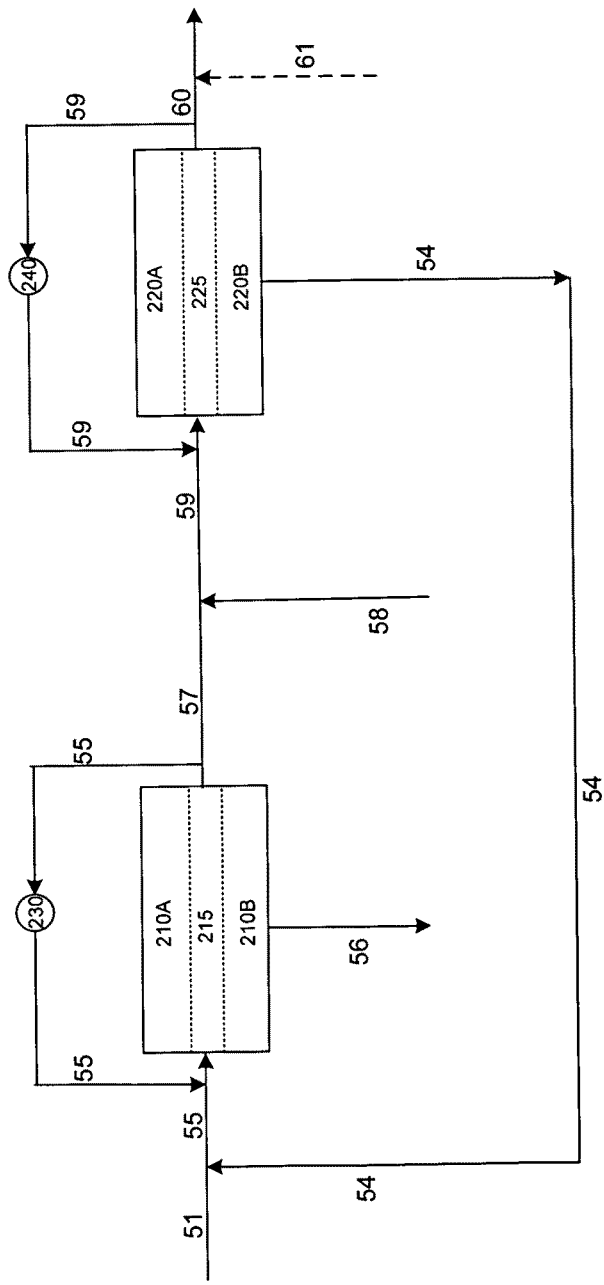
FIG. 5 is a block diagram illustrating the use of multiple cross-flow microfiltration units as described herein.

In particular, the feedstock to the catalyst deoiling zone can be the catalyst bleed stream from a vacuum resid unit, which is primarily made-up of spent finely divided unsupported slurry catalyst, carbon fines, and metal fines in unconverted resid hydrocarbon oil. The solids content of the feedstock can be in the range of about 5-40 weight %, for example about 10-30 weight % or about 15-25 weight %.
Diafiltration As noted above, "diafiltration" refers to a cross-flow filtration process allowing for the transfer of low molecular weight species, water and/or solvents through a membrane without changing the solution volume. Diafiltration is used for purifying retained large molecular weight species, increasing the recovery of low molecular weight species, buffer exchange and simply changing the properties of a given solution. In particular, diafiltration can comprise the use of multiple stages (e.g., between about 1 and 11 stages) of cross-flow filtration to transfer a fine solid from a slurry in a first solution (e.g., a heavy bleed oil or hydrocarbon solution) to a slurry in a second solution (e.g., solvent such as, for example, toluene or light naphtha).
Microfiltration In the deoiling zone, feed stream to the deoiling zone can be washed with a light specific gravity solvent, such as, for example, toluene, propane, or diesel boiling range material, in a counter-current fashion in one or more microfiltration units or sequentially washed with a light specific gravity solvent in a counter-current fashion through multiple microfiltration units until the unconverted oil is completely removed from the catalyst particles, leaving a stream consisting of catalyst solids in light specific gravity solvent. Referring to FIG. 5, the deoiling zone can comprise at least two or more (e.g., ten) microfiltration units, for example, at least four or at least six microfiltration units. The deoiling zone comprising multiple microfiltration units is operated at a pressure in the range of about 50-400 psi, for example, about 100-300 psi or about 150-200 psi. Membranes in the microfiltration units can consist of, for example, $TiO_2$ coated metal membranes. Pressure drops across the membrane in the microfiltration units, referred to as the transmembrane pressure, are in the range of about 0-50 psi, for example, about 0-30 psi or about 0-10 psi. The temperature of the deoiling zone is in the range of about 100-500° F., for example, about 200-450° F. or about 300-400° F.

With further reference to FIG. 5, feedstock 51 is mixed with light hydrocarbon solvent 54 to form stream 55, which is fed to a first microfiltration unit consisting of membrane 215 separating top section 210A and bottom section 210B. Typically, stream 55 enters the tube side of a multi-tube bundle of membrane elements with the permeate stream 56 exiting the shell side of the membrane housing. In the description that follows, light hydrocarbon solvent 54 is a toluene rich stream (i.e., permeate from the second stage of filtration). Slurry pump 230 maintains a constant velocity in the tubes, preventing settling or agglomeration of catalyst particles. A portion of unconverted oil along with toluene passes through membrane 215 to bottom section 210B and out of the first microfiltration unit as stream 56 and can be sent to a distillation process to recover toluene and unconverted oil as separate streams. Retentate stream 57 is diluted with a toluene rich stream 58 to form stream 59, which is passed to a second microfiltration unit. The second microfiltration unit consists of membrane 225 separating top section 220A and bottom section 220B. Slurry pump 240 maintains a constant velocity in top portion 220A above membrane 225 and keeps stream 59 in continuous motion, preventing settling or agglomeration of catalyst particles. A portion of unconverted oil along with toluene passes through membrane 225 to bottom section 220B and out of the second microfiltration unit as stream 54, which is recycled to be mixed with feedstock 51 to form stream 55.

Retentate stream 60 is diluted with a toluene rich stream 61 and passed to a succeeding microfiltration unit. Toluene rich stream 61 is a stream of unconverted oil along with toluene, which passed through the membrane of a succeeding microfiltration unit. As the retentate streams move forward to succeeding microfiltration units, the retentate streams are sequentially washed counter-currently with toluene rich streams passed through the membranes of succeeding microfiltration units. The retentate streams are sequentially washed in a "counter-current" fashion, in that retentate streams pass from one microfiltration unit to the next (e.g., five to six total stages), while the solvent that is added to the retentate streams comes from one more downstream microfiltration units. For example, in an embodiment, the solvent cascades from the last microfiltration unit to the first microfiltration unit, counter to the flow of the retentate streams passing through the microfiltration units. In this way, the liquid portion of the feed to the first microfiltration unit comprises a mixture of solvent and unconverted oil, while the liquid portion of the feed to the last microfiltration unit comprises substantially pure solvent, and the retentate stream of the last microfiltration unit comprises the catalyst particles in substantially pure solvent.

In summary, filtering in the deoiling zone can comprise filtering the slurry and solvent through a (cross-flow) microfiltration unit. A retentate stream of the (cross-flow) microfiltration unit is recovered. The retentate stream of the (cross-flow) microfiltration unit is combined with solvent to form a combined retentate-solvent stream. The combined retentate-solvent stream is filtered through a (cross-flow) microfiltration unit.

The solvent of the combined retentate-solvent stream can be a different solvent than the solvent of the combined slurry-solvent stream, the same solvent as the solvent of the combined slurry-solvent stream, or include solvent from a different source than the solvent of the combined slurry-solvent stream. The retentate stream of the (cross-flow) microfiltration unit can be combined with solvent prior to the (cross-flow) microfiltration unit through which the combined retentate-solvent stream is filtered or the retentate stream of the (cross-flow) microfiltration unit can be combined with solvent in the (cross-flow) microfiltration unit through which the combined retentate-solvent stream is filtered.

A permeate stream of a (cross-flow) microfiltration unit other than the first (cross-flow) microfiltration unit can be recycled to be used as the solvent combined with the slurry comprising unsupported fine catalyst in heavy oil to form the combined slurry-solvent stream. Catalyst can be recovered from a retentate stream of the final (cross-flow) microfiltration unit. When multiple (cross-flow) microfiltration steps take place, the (cross-flow) microfiltration units of each step can be the same (cross-flow) microfiltration unit or different (cross-flow) microfiltration units. The number of stages of filtration and the solvent to heavy oil ratio are set to achieve the required deoiling efficiency.

Vibratory Shear Enhanced Processing

In addition to, or alternative to, diafiltration and/or microfiltration, the deoiling zone can comprise Vibratory Shear Enhanced Processing (V*SEP), which produces intense shear waves on the face of a membrane. In particular, the one or more microfiltration units described above may be replaced by one or more V*SEP machines. In an embodiment, the use of V*SEP machines, as opposed to microfiltration, could allow for the same separation efficiency to be achieved with fewer filtration stages. In particular, while typical cross-flow filters are usually limited to solids contents of 25-35 weight % to avoid fouling of the membrane, V*SEP machines can accept higher solids contents (50-70 weight %) while maintaining performance. Accordingly, the use of V*SEP allows for greater oil removal per stage in diafiltration mode, which would reduce the required number of stages.

In a V*SEP machine, manufactured by New Logic Research, Inc., Emeryville, Calif., a slurry to be filtered remains nearly stationary, moving in a leisurely, meandering flow. Shear cleaning action is created by rapidly (i.e., 50-60 Hz) horizontally displacing the membrane (i.e., in directions in the same plane as the face of the membrane). In an embodiment, the displacement is rotational or oscillatory. The shear waves produced by the displacement, or vibration, of the membrane cause solids and foulants to be lifted off the membrane surface and remixed with the slurry and expose the membrane pores for maximum throughput.

The V*SEP machine operates with relatively low cross-flow velocities, thus preventing a significant pressure drop from the inlet (high pressure) to the outlet (lower pressure) end of the device, which can lead to premature fouling of the membrane that creeps up the device until permeate rates drop to unacceptably low levels.

Variable vibration amplitude and corresponding shear rate, oscillation frequency, and shear intensity directly affect filtration rates. Shearing is produced by the torsion oscillation of the membrane. Typically, the membrane oscillates with an amplitude of about 1.9-3.2 cm peak to peak displacement at the edge of the membrane. The oscillation frequency is typically about 50-60 Hz, for example, about 53 Hz, and produces a shear intensity of, for example, about 150,000 inverse seconds.

Operating pressure in a V*SEP machine is created by the feed pump. While higher pressures often produce increased permeate flow rates, higher pressures also use more energy. Therefore, the operating pressure optimizes the balance between flow rates and energy consumption. Microfiltration (about 0.1-2.0 μm) membranes used in V*SEP machines are typically polytetrafluoroethylene (Teflon®), for example, polytetrafluoroethylene on woven fiberglass, can withstand temperatures of 130° C. (266° F.), and as polytetrafluoroethylene membranes are chemically inert, can handle continuous pH levels of 0-14. Microfiltration membrane operating pressures are usually in the range of about 30-100 psi (about 2-7 bar).

In summary, the deoiling zone can comprise a membrane that is rapidly displaced in a horizontal direction. A retentate of the membrane comprises the fine catalyst and a permeate of the membrane comprises the heavy oil. In particular, rapidly displacing the membrane in a horizontal direction can comprise rotating the membrane. The retentate of the membrane can be washed with solvent, such as, for example, toluene. The heavy oil and fine catalyst can be combined with solvent, such as, for example, toluene prior to filtering. The membrane can comprise a nominal pore size rating of about 0.05-0.5 µm, for example, about 0.1-0.3 µm, about 0.05-0.15 µm, or about 0.1 µm. At least about 95 weight % of the fine catalyst can be recovered in the retentate of the membrane. Filtering can be conducted at a temperature of about 90-110° C. and a pressure of about 80-100 psi, for example at a temperature of about 100° C. and a pressure of about 90 psi. A permeate stream of the membrane, comprising heavy oil and solvent, can be recovered in addition to a retentate stream of the membrane, comprising unsupported fine catalyst and solvent, and unsupported fine catalyst can be separated from the retentate stream of the membrane.

In an embodiment, V*SEP can be used to aid in the transport of catalyst (slurry) prior to heavy oil upgrading. In particular, V*SEP can be used to concentrate catalyst slurry to a solids contents of, for example, about 60-70 weight %. Due, in part, to the concentrated catalyst slurry having a reduced volume as compared to the volume of the catalyst slurry prior to concentration via V*SEP, the concentrated catalyst slurry can then be more easily transported to a heavy oil upgrading site or reactor, where it would be reconstituted to a solids contents of, for example, about 5 weight %, prior to heavy oil upgrading.

EXAMPLES

The following illustrative examples are intended to be non-limiting.

Cross-Flow Filtration Example

A feedstock of used resid hydroprocessing slurry phase catalyst (1 to 10 µm) in unconverted heavy oil product was processed using eight stages of cross-flow filtration. The cross-flow filtration was conducted at 175° C. and 75 psig. The feed slurry solids content was 12 weight %. In each stage the feed oil was diluted with an amount of toluene equal to the original feed slurry. The resulting mixture was circulated through the cross-flow filtration module until sufficient oil and toluene permeated through the membrane to create a reconcentrated slurry of 25 weight % solids. A recirculating pump maintained a sufficient velocity through the tubes of the filter housing (greater than 10 feet/second) to avoid membrane fouling.

The design of the membrane was such that only the oil could permeate through the walls of the tube into the shell side of the bundle while the fine solid catalyst was retained on the tube side. By repeating this process an additional seven times the catalyst was transferred into a substantially oil-free toluene stream. The resulting toluene slurry was evaporated in a combination vertical film/horizontal dryer to produce a dry solid. The hottest zone in the dryer was operated at a temperature of 550° F. Analysis of the dry solid gave less than 0.5 weight % toluene extractable oil, which indicates over 99.9% oil removal. This material was found to sufficiently deoiled to allow recovery of the active metals using a water based leaching process. An analysis of the permeate oil stream showed no detectible level of molybdenum, which provides confirmation that the molybdenum based catalyst was quantitatively recovered into the clean toluene slurry.

The single stage cross-flow filtration membrane module run eight times in sequence simulated an eight stage cross-flow system. However, a very large amount (7.75 times the fresh slurry rate) of toluene was used since each stage was cross-flow and a very high deoiling extent was targeted. In an embodiment, toluene is added only to the last stage and the toluene permeate cascades to the prior stage, requiring perhaps 5 or 6 stages (and a toluene rate of 2-3 times the fresh slurry rate).

V*SEP Example

Catalyst in oil exchanged with toluene was tested at 100° C. (temperature correction base). Twenty gallons of a catalyst/oil slurry feed were tested. First, the solids were concentrated in oil and then the solids were washed or diafiltered in oil slurry using toluene as the wash solvent (i.e., the oil was exchanged with solvent). The pumpable catalyst/oil slurry contained 14 weight % catalyst solids and other solids and 86 weight % oil. In an embodiment, the oil is removed and replaced by toluene until the oil concentration is less than about 2 weight %.

Specifically, toluene was used as a replacement solvent to displace the oil and keep the total solids at a pumpable level. Any permeate containing oil or toluene can be sent to a distillation column for recovery. The final washed catalyst solids can be further treated using another technology. Only oil, toluene, and soluble solids would pass through the membrane, while catalyst solids would be retained. Accordingly, catalyst slurry in a liquid form with reduced amounts of oil is produced, which would be suitable for additional treatment steps. In an embodiment, at least about 95 weight % of the solids in the final washed concentrate (retentate) are recovered. Heating equipment was used and a sealed nitrogen purged tank was used to process the feed liquid.

Figure 6:
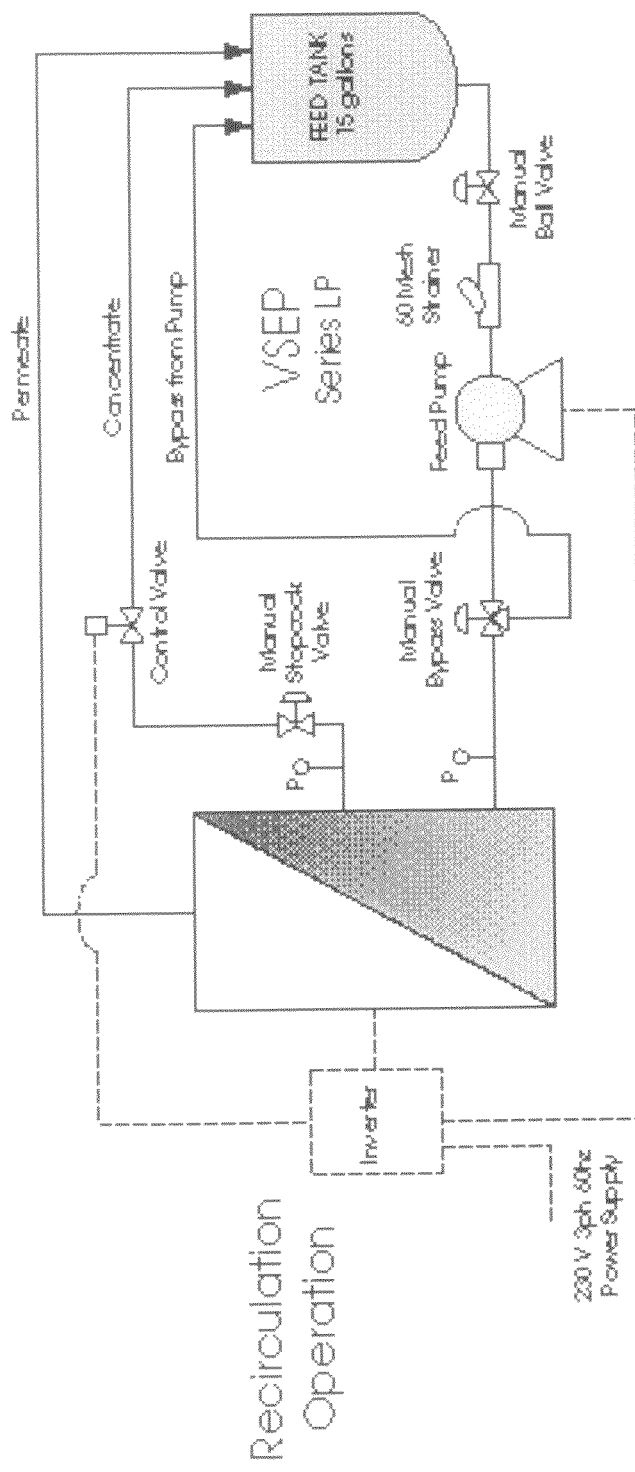
FIG. 6 is a block diagram showing recirculation operation according to the Vibratory Shear Enhanced Processing (V*SEP) Example described herein.

Testing was conducted by isolating as many of the variables as possible to determine optimum variables. Variables included type of membrane, temperature, pressure, concentration factor, and fouling. Variables were tested as follows.
Preliminary The sample material was pre-screened using a 100-mesh screen to remove large particles and then placed into a feed tank connected to a Series L V*SEP Machine. The membranes were installed and feed was introduced and pumped into the Series L V*SEP Machine.
Step 1. Membrane Study The membrane study was used to evaluate a variety of membranes on the sample material to determine the optimum membrane in terms of flux and/or permeate quality. The performance was measured in "recirculation mode", meaning that the material was not concentrated but the separated streams were returned to the feed tank and only the relative performance of each membrane under the same conditions was measured. "Recirculation mode" is shown in FIG. 6.
Step 2. Pressure Study The pressure study was used to determine the optimum pressure of the chosen membrane on the particular feed material. The permeate rate was measured as incremental increases in pressure were made to the system. The pressure study determined whether it is possible to reach a point at which increased pressure does not yield significant increase in permeate flow rate, and at what pressure increasing pressure further does not yield significant increase in permeate flow rate.

Step 3. Long Term Line-Out Study

The long term line-out study was used to measure the flux versus time to determine if the permeate rate is stable over a period of a time. The long term line-out study was an extended test to verify whether the system will lose flux, as do tubular cross flow systems. The results of the long term line-out study can also be used to determine a cleaning frequency, if one is necessary.

Step 4. Washing Study

The washing study was designed to measure flux versus wash volume in order to evaluate an average flux over each individual washing. The washing study was completed in batch mode, as the membrane area of the Series L V*SEP Machine was only 0.5 ft$^2$. Permeate was continually removed from the system while the concentrated material was returned to the feed tank. The washes were added one at a time and when an equivalent amount of permeate compared to the added wash water was removed then one wash was complete. For the washing study, one continuous wash was completed in batch mode. As permeate was removed, additional toluene was added to the tank.

Step 5. Concentration Study

The concentration study was designed to concentrate the solids to a desired endpoint, if not obtained in the washing study. The concentration study was completed in batch mode, as the membrane area was only 0.5 ft$^2$. Permeate was continually removed from the system while the concentrated material was returned to the feed tank. The resulting data was used to determine the average flux over the concentration/recovery range, which, in turn, allows for preliminary system sizing.

Test conditions included a temperature of about 90-100° C. (temperature corrected to 100° C.), a pressure of about 100-120 psi for the membrane study and 90 psi for the washing study, a sample size of 20 gallons, and, as noted above, a membrane area of 0.5 ft$^2$.

Results

Membrane Selection

Two membranes having good chemical resistance and that can tolerate high temperature, detailed in Table 1, were selected for study.

TABLE 1

Membranes Tested

| Membrane | Type | Pore Size | Maximum Temperature | Water Flux* |
|---|---|---|---|---|
| Teflon ® on Halar ® | Microfiltration | 0.05 µm | 200° C. | 500 gfd |
| Teflon ® on Woven Fiberglass | Microfiltration | 0.1 µm | 200° C. | 750 gfd |

*Average Batch Cell Test Results on New Membrane at 60 psi and 20° C.

The relative performance of each of the selected membranes was tested. The feed tank was prepared with the sample feed material and the system was configured in "recirculation mode". Each of the membranes shown above was installed and a two to four hour "line-out study" was conducted. The membranes were compared based on flux and permeate quality.

Table 2 shows the relative performance of each membrane.

TABLE 2

Results of Membrane Selection

| Membrane | Initial Flow* | Ending Flow* | Pressure |
|---|---|---|---|
| Teflon ® on Halar ® | 42.6 ml/min | 47.8 ml/min | 100 psi |
| Teflon ® on Woven Fiberglass | 25.8 ml/min | 11.7 ml/min | 120 psi |

*Temperature corrected to 100° C.

Figure 7:
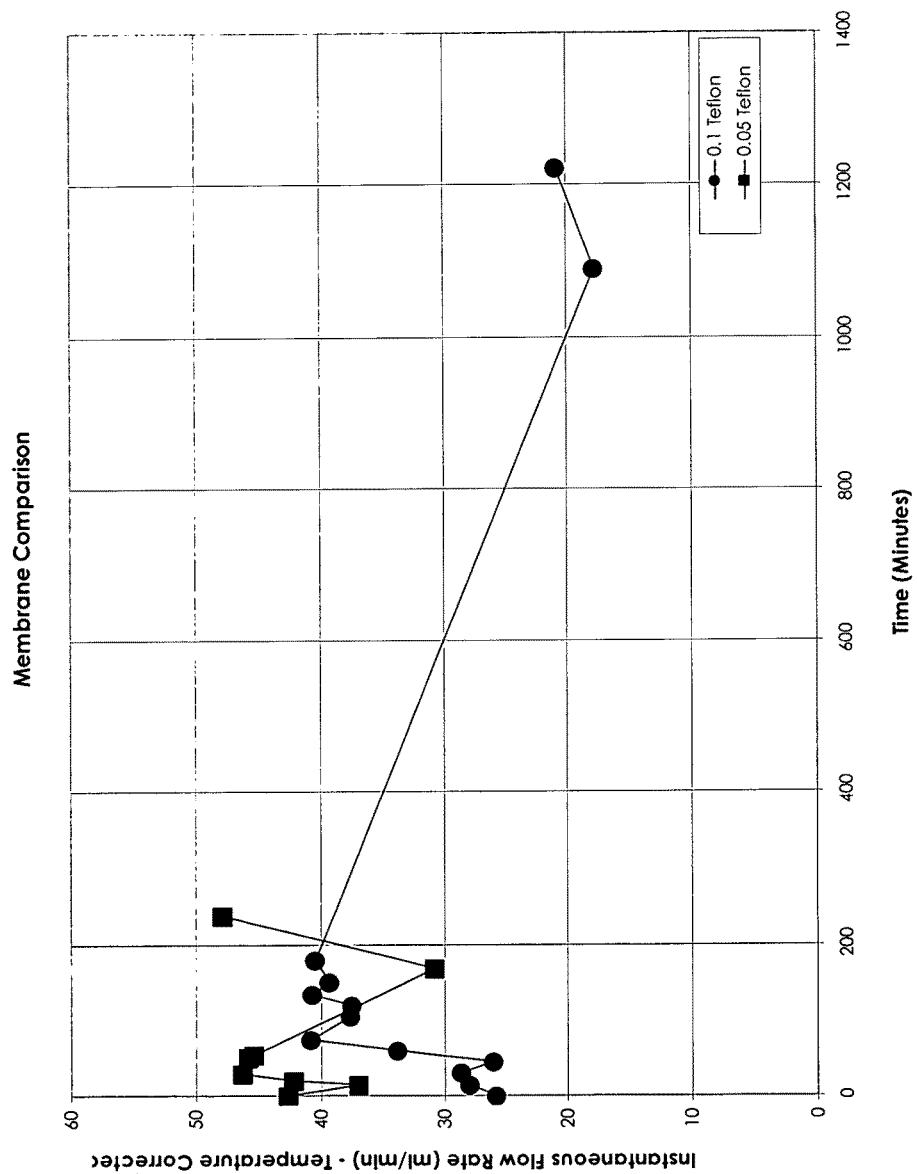
FIG. 7 is a graph of the Membrane Study according to the V*SEP Example described herein.

FIG. 7 is a graph of the results of the membrane study. The operating temperature was 100° C.

Factors used to select a membrane include, for example, flow rate, permeate flux rate, filtrate quality, chemical compatibility of the membrane, mechanical strength of the membrane, and temperature tolerance of the membrane.

The 0.05 µm Teflon® membrane had better flux rates than the 0.1 µm Teflon® membrane. Analytical testing results on the filtrate from each showed that the 0.05 µm Teflon® membrane had 181 ppm of suspended solids in the filtrate, while the 0.1 µm Teflon® membrane had only 72 ppm of total suspended solids. The feed slurry was 9.18 weight % solids and 90.82 weight % oil. Accordingly, the 0.05 µm Teflon® membrane provided a better flow rate but worse permeate quality.

In addition to an excellent flow rate or permeate quality, the membrane must be durable and able to stand up to the feed material. Many materials are available for membrane construction, which remains an available optimizing technique. In addition to the membrane itself, all of the other wetted parts should be examined for compatibility. Both Halar® (ethylene chlorotrifluoro-ethylene) and woven fiberglass material chemically inert and would be compatible with toluene and the oil carrier. In addition, both would be capable of tolerating the 100° C. process temperature. The membranes are essentially equivalent in terms of chemical compatibility and temperature tolerance criteria.

However, in terms of mechanical strength of the membranes, woven fiberglass backing material is much stronger and would hold up better over the long term than Halar®. Accordingly, the 0.1 µm Teflon® membrane on woven fiberglass was chosen for further analysis.

Pressure Selection

Figure 8:
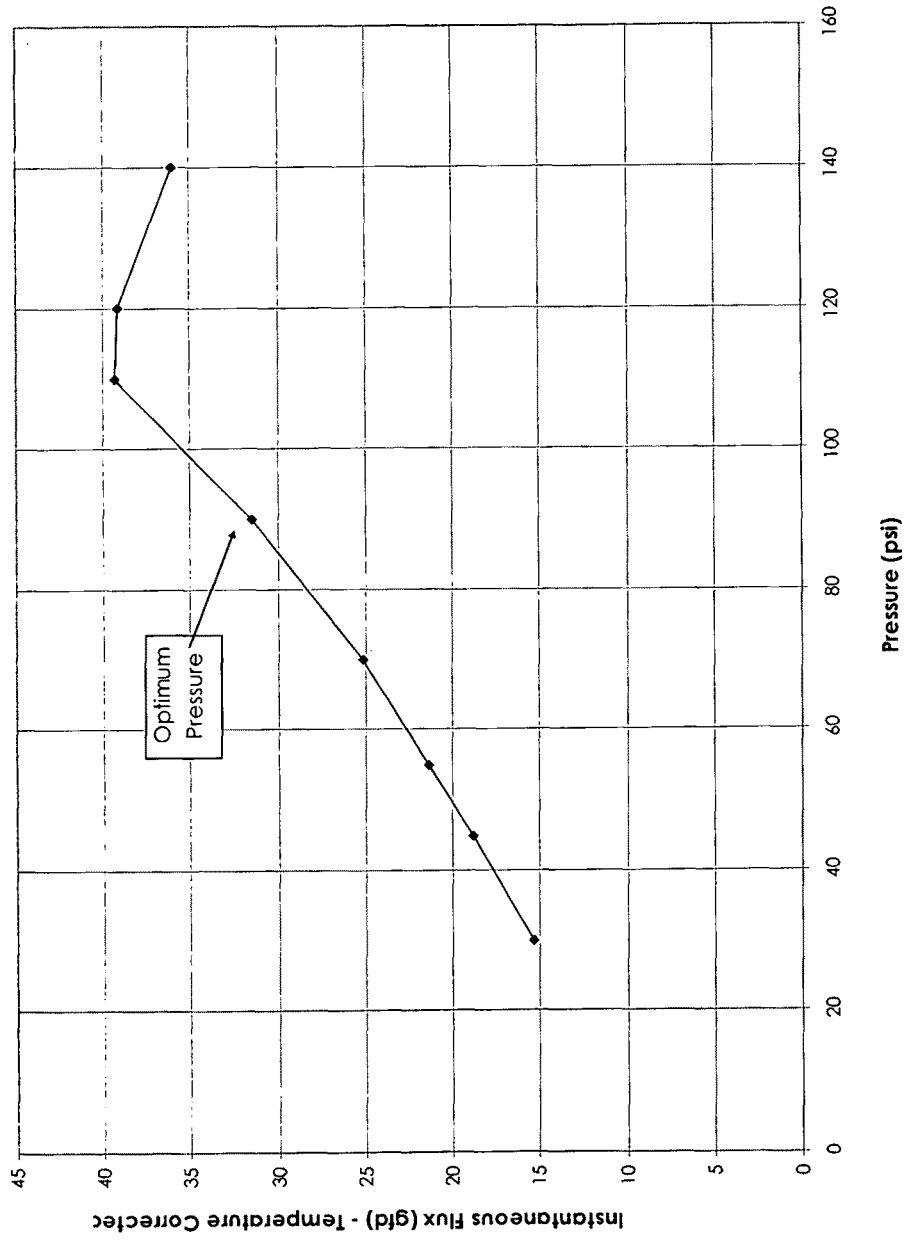
FIG. 8 is a graph of the Pressure Study according to the V*SEP Example described herein.

The results of the pressure study are shown in FIG. 8. The operating temperature was 100° C. An optimum pressure was determined by measuring the flux at various pressures. The greatest flux occurred at 90 psi, giving an optimum pressure of 90 psi.

Initial Concentration

The system was started up first in "recirculation mode" and set to the optimum pressure and expected process temperature. The system was run for a few hours to verify that the flux was stable and the system has reached equilibrium.

Figure 9:
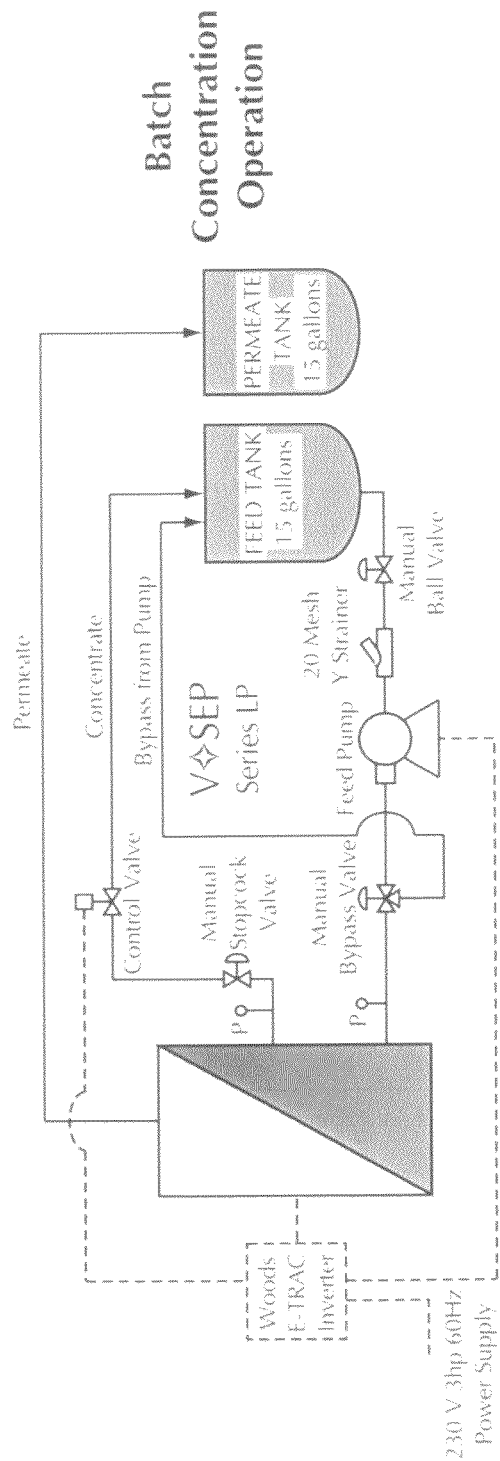
FIG. 9 is a block diagram showing batch operation according to the V*SEP Example described herein.

The permeate line was then diverted to a separate container so the system was operating in "batch" mode. The permeate flow rate was measured at timed intervals to determine flow rate produced by the system at various levels of concentration. As permeate was removed from the system, the solids concentration rose in the feed tank. "Batch" mode is shown in FIG. 9.

Initial concentration allows for reduction of the volume of the feed by removing oil and concentrating the solids. As a result, it is possible to use less volume of wash solvent. No wash solvent has been added and only the initial solids are concentrated.

Table 3 shows the mass balance results of the initial concentration.

TABLE 3

Mass Balance Results

| Initial Volume | Ending Volume | % Recovery | Initial % Solids | Ending % Solids |
|---|---|---|---|---|
| 20 gallons | 11.7 gallons | 41.49% | 9.18% | 15.69% |

The initial concentration was done at about 100° C. and a pressure of about 90 psi. While further concentration could have been performed, after the initial concentration the feed was very viscous and the flux rates were relatively low due to the viscosity. It was believed that the addition of toluene would cut the viscosity and greatly improve the flux rate. Concentrating was stopped at about 41% recovery, since a significant volume reduction had taken place, the percentage of solids had risen to a respectable level, and flow rates could be improved with toluene addition.

Table 4 shows system performance during the initial concentration.

TABLE 4

Initial Concentration Results

| Initial Flux | Ending Flux | Average Flux | Pressure | Temperature |
|---|---|---|---|---|
| 34.5 gfd | 28.2 gfd | 29.6 gfd | 90 psi | 100° C. |

Diafiltration Process

Once the feed had been volume reduced by 41% and about 11.7 gallons of feed remained, the system configuration was preserved with permeate being diverted to a separate container and the reject line being returned to the feed tank. Also, clean toluene was added to the feed tank in a topped off fashion to maintain the tank level and replenish the feed volume as filtrate was removed.

Processing continued for several days. During the washing study, nine small samples were taken of the permeate and concentrate at different times throughout the washing study. After about 75 gallons of was solvent had been added, the washing process was stopped. Initially, the filtrate was very dark and oily. As the wash process continued, the filtrate became lighter in color until the color was a very light amber. Table 5 shows the mass balance results during the diafiltration.

TABLE 5

Diafiltration Mass Balance Results

| ID | Time | Filtrate Removed | Wash Volume | Permeate Solids | Reject Solids |
|---|---|---|---|---|---|
| 1 | 165 min | 1.8 gal | 0.1x | 1 ppm | 9.77% |
| 2 | 301 min | 3.1 gal | 0.3x | 3 ppm | 9.88% |
| 3 | 906 min | 10.3 gal | 1.0x | 153 ppm | 4.62% |
| 3a | 1117 min | 12.5 gal | 1.3x | 4 ppm | 11.31% |
| 4 | 2362 min | 38.3 gal | 4.0x | 1500 ppm | 7.86% |
| 5 | 2974 min | 58.0 gal | 5.7x | 406 ppm | 24.51% |
| 6 | 3122 min | 61.1 gal | 5.9x | 481 ppm | 41.33% |
| 7 | 3180 min | 61.9 gal | 6.0x | 137 ppm | 38.58% |
| 8 | 3430 min | 71.9 gal | 6.9x | 21 ppm | 25.01% |
| 9 | 3983 min | 80.3 gal | 7.6x | 32 ppm | 42.41% |

Prior to testing, it was estimated that six wash volumes would be enough to theoretically "clean" the solids and remove enough oil. During the course of testing, about 75 gallons of clean toluene were used. Diafiltration was stopped after the supply of toluene was exhausted and after more than six wash volumes had been completed. The ending volume was concentrated until the feed slurry was reasonably thick. Concentration was stopped when the slurry was quite thick and there existed a risk of plugging.

Figure 10:
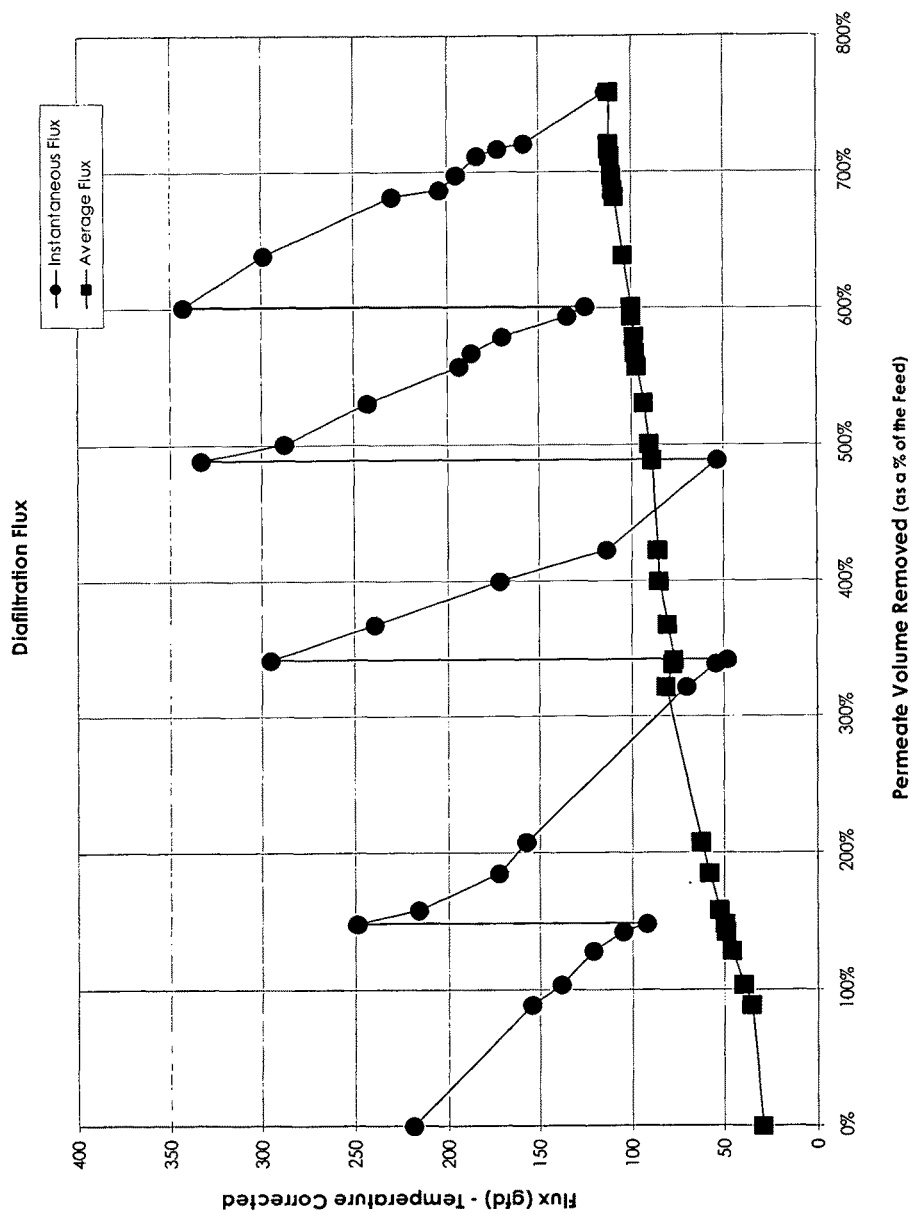
FIG. 10 is a graph of the Diafiltration Study according to the V*SEP Example described herein.

FIG. 10 is a graph of the diafiltration study. Process conditions included a temperature of 100° C., a pressure of 90 psi, and the Teflon® on woven fiberglass membrane with 0.1 µm pore size. The average flux plot includes data from the initial concentration, not shown in the graph. The actual average flux during testing was 112 gfd.

During testing several observations were made: 1) nonwoven fiberglass drain cloth ("Manniglass") did not hold up mechanically; 2) nylon "Tricot" drain cloth did hold up well; 3) polypropylene drain cloth worked acceptably but swelled; 4) when the system sat idle, solids would settle in the piping and plug the system; 5) good pre-screening is needed to catch agglomerations; 6) no significant $H_2S$ was present in the sample (300 ppm was present initially but removed); 7) flux rates were low on oil, but improved greatly once toluene was added; 8) Viton® elastomers swelled badly and failed several times; 9) low crossflow allowed accumulation of solids in the filter head; and 10) a cake layer built up on the membrane surface.

As mentioned above, at first, the filtrate was dark colored, although not turbid. Toward the end of the diafiltration, the color changed to a light amber color. During testing, there were several instances where the filter head was disassembled to replace leaking Viton® seals and failed drain cloth materials. Each time the filter head was opened, the permeate chamber was contaminated with the feed slurry. Upon resumption of operation, the filtrate would exhibit some turbidity initially, and then would clear up as the contamination cleared. Large variations were observed in the percentage of solids in the filtrate. Without wishing to be bound by theory, it is believed that the large variations were observed in the percentage of solids in the filtrate can be explained by permeate chamber contamination.

Table 6 shows the permeate quality after a membrane change.

TABLE 6

Diafiltration Time Results

| ID | Total Time | Delta Time | Permeate Solids |
|---|---|---|---|
|  | 2313 min | 0 min | Membrane Change |
| 4 | 2362 min | 49 min | 1500 ppm |
|  | 2792 min | 0 min | Membrane Change |
| 5 | 2974 min | 182 min | 406 ppm |
| 6 | 3122 min | 330 min | 481 ppm |
| 7 | 3180 min | 388 min | 137 ppm |
| 8 | 3430 min | 638 min | 21 ppm |
| 9 | 3983 min | 1191 min | 32 ppm |

The membrane itself should be able to hold back a significant percentage of solids. Solids in the permeate may not be a result of solids passing through membrane pores. Rather, contamination might have contributed to solids in the filtrate. In addition, swelled Viton® o-rings might have been providing, at best, a marginal seal. Each time the membrane was changed a new set of o-rings was installed. With no contamination of the permeate chamber and with good o-ring seals, the solids in the filtrate might be in the range of about 10-20 ppm.

Figure 11:
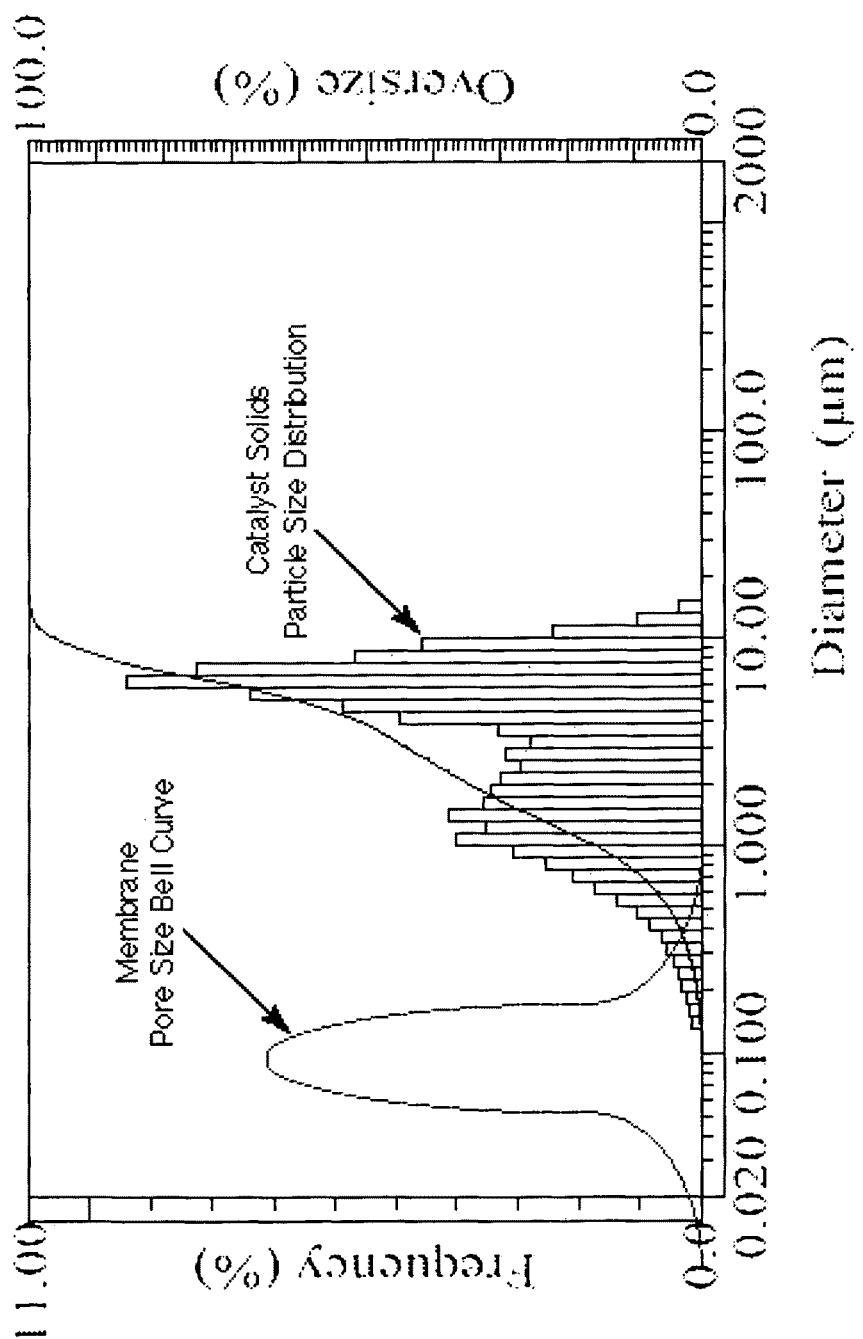
FIG. 11 is a graph of particle size distribution according to the V*SEP Example described herein.

Another possible explanation for the solids in the filtrate is the distribution of pore sizes in the membrane. In particular, while membranes have nominal pore size ratings, the actual pore sizes in any given membrane vary. The pore size distribution curve is shaped like a bell curve. The nominal pore size rating is normally the mean of all the sizes. Thus, a membrane with a nominal pore size rating of 0.1 μm can have pores as large as 1.0 μm. Examining the particle size distribution of the catalyst solids, there could be some overlap, as shown in FIG. 11.

Teflon® membranes rated at 0.05 μm, or smaller, might even be too large to completely remove all solids. While smaller membranes, with pore sizes down to 0.01 μm, made of other materials including polyvinylidene difluoride (PVDF; Kynar®), might have better solids removal capability, such membranes might have lower chemical and temperature tolerance and be less durable over time.

Many modifications of the exemplary embodiments disclosed herein will readily occur to those of skill in the art. Accordingly, the present disclosure is to be construed as including all structure and methods that fall within the scope of the appended claims.

What is claimed is:

1. A method of recovering unsupported fine catalyst from a slurry comprising unsupported fine catalyst in heavy oil to generate a concentrated catalyst slurry, the method comprising:
providing a deoiling zone comprising a cross-flow microfiltration unit having a membrane that is rapidly displaced in a horizontal direction;
providing to the deoiling zone a solvent and a slurry comprising unsupported fine catalyst in heavy oil having a first volume concentration of solids as unsupported fine catalyst;
recovering from the deoiling zone a permeate stream comprising heavy oil and solvent, and a retentate stream as a concentrated slurry comprising unsupported fine catalyst having a second volume concentration of solids as unsupported fine catalyst greater than the first volume concentration; and
transporting the concentrated slurry to a heavy oil upgrading site; and
reconstituting the concentrated slurry to a solids content of about 5 weight % prior to the deoiling zone for use as unsupported catalyst in heavy oil upgrading.

2. The method of claim 1, wherein the retentate stream is pumpable.

3. The method of claim 1, wherein the retentate has more solvent than heavy oil.

4. A method for separating fine catalyst from heavy oil in a slurry comprising unsupported fine catalyst in heavy oil to generate a concentrated catalyst slurry, the method comprising:
providing a cross-flow microfiltration unit;
providing to the cross-flow microfiltration unit a solvent and a slurry comprising fine catalyst in heavy oil having a first volume concentration of solids;
filtering the fine catalyst from the heavy oil using the cross-flow microfiltration unit by rapidly displacing a membrane in a horizontal direction;
recovering a retentate of the membrane as a concentrated slurry comprising the fine catalyst having a second volume concentration of solid greater than the first volume concentration and a permeate of the membrane comprises heavy oil and solvent; wherein filtering is conducted at a pressure of less than 400 psi and a membrane nominal pore size rating of less than 2 μm;
transporting the concentrated slurry to a heavy oil upgrading site: and
reconstituting the concentrated slurry to a solids content of about 5 weight % prior to filtering for use as unsupported catalyst in heavy oil upgrading.

5. The method of claim 4, wherein rapidly displacing the membrane in a horizontal direction comprises rotating the membrane.

6. The method of claim 5, wherein rotating the membrane comprises oscillating the membrane with an amplitude of about 1.9-3.2 cm peak to peak displacement at an edge of the membrane, which produces an oscillation frequency of about 50-60 Hz and a shear intensity of about 150,000 inverse seconds.

7. The method of claim 4, further comprising washing the retentate of the membrane with solvent.

8. The method of claim 7, wherein the solvent comprises toluene.

9. The method of claim 4, further comprising combining the heavy oil and fine catalyst with solvent prior to filtering.

10. The method of claim 9, wherein the solvent comprises toluene.

11. The method of claim 4, wherein the membrane comprises polytetrafluoroethylene.

12. The method of claim 4, wherein the membrane comprises polytetrafluoroethylene on woven fiberglass.

13. The method of claim 4, wherein the membrane comprises a nominal pore size rating of about 0.05-0.5 μm.

14. The method of claim 4, wherein the membrane comprises a nominal pore size rating of about 0.1 μm.

15. The method of claim 4, wherein the fine catalyst comprises partially or completely deactivated fine catalyst.

16. The method of claim 4, wherein rapidly horizontally displacing the membrane produces shear waves that cause solids and foulants to be lifted off the membrane surface and expose pores of the membrane.

17. The method of claim 4, further comprising recovering at least about 95 weight % of the fine catalyst in the retentate of the membrane.

18. The method of claim 4, wherein filtering is conducted at a temperature of about 90-110° C. and a pressure of about 80-100 psi.

19. The method of claim 4, wherein filtering is conducted at a temperature of about 100° C.

20. The method of claim 4, wherein filtering is conducted at a pressure of about 90 psi.

21. A method of recovering unsupported fine catalyst from heavy oil in a slurry comprising unsupported fine catalyst in heavy oil to generate a concentrated catalyst slurry, the method comprising:
combining a slurry comprising unsupported fine catalyst in heavy oil with solvent to form a combined slurry-solvent stream;
filtering the combined slurry-solvent stream using a cross-flow microfiltration unit with a membrane by rapidly displacing the membrane in a horizontal direction;
recovering a retentate stream of the membrane as a concentrated slurry comprising the unsupported fine catalyst and solvent, and a permeate of the membrane comprising the heavy oil and solvent; and
transporting the concentrated slurry to a heavy oil upgrading site: and
reconstituting the concentrated slurry to a solids content of about 5 weight % prior to filtering for use as unsupported catalyst in heavy oil upgrading.

22. A method of concentrating a slurry comprising unsupported fine catalyst in heavy oil, the method comprising:
filtering heavy oil from fine catalyst using a cross-flow microfiltration unit with a membrane by rapidly displacing the membrane in a horizontal direction to produce a concentrated slurry comprising unsupported fine catalyst that is pumpable;

recovering the concentrated slurry;

transporting the concentrated slurry to a heavy oil upgrading site; and reconstituting the concentrated slurry to a solids content of about 5 weight % prior to filtering for use as unsupported catalyst in heavy oil upgrading.

23. The method of claim 22, wherein the concentrated slurry comprises a solids contents of about 60-70 weight %.

* * * * *